United States Patent
Yoshikawa

[11] Patent Number: 5,265,126
[45] Date of Patent: Nov. 23, 1993

[54] VOICE RECORDING AND REPRODUCING APPARATUS HAVING PERPENDICULAR CARRIER MODULATION

[75] Inventor: Shuichi Yoshikawa, Nara, Japan

[73] Assignee: Sharp Kabushiki Kaisha, Osaka, Japan

[21] Appl. No.: 705,805

[22] Filed: May 28, 1991

[30] Foreign Application Priority Data

May 31, 1990 [JP] Japan .................. 2-144178

[51] Int. Cl.⁵ .............. H04B 14/06; H04L 5/12; H03D 3/22
[52] U.S. Cl. .......................... 375/27; 375/39; 375/67; 375/83; 332/103; 329/304; 360/32
[58] Field of Search ............ 375/27, 39, 67, 83; 332/103; 329/304; 360/32

[56] References Cited

U.S. PATENT DOCUMENTS

| | | | |
|---|---|---|---|
| 4,123,710 | 10/1978 | Stuart et al. | 375/39 |
| 4,348,699 | 9/1982 | Tsuchiya et al. | 360/32 |
| 4,584,534 | 4/1986 | Lijphart et al. | 375/83 |
| 4,656,648 | 4/1987 | Vallet | 375/83 |
| 4,910,751 | 3/1990 | Einarsson | 375/27 |
| 5,057,786 | 10/1991 | Yoshikawa | 375/39 |
| 5,095,392 | 3/1992 | Shimazaki et al. | 360/32 |

Primary Examiner—Rolf Hille
Assistant Examiner—Robert Limanek
Attorney, Agent, or Firm—Nixon & Vanderhye

[57] ABSTRACT

A voice signal is modulated using two carriers which are perpendicular to each other. The modulated signal is supplied to a low-pass filter, and then sampled. The sampled data are encoded, and then stored. When the stored data are to be reproduced, the data are decoded, and sampled. The sampled data are supplied to a demodulator through a low-pass filter.

6 Claims, 6 Drawing Sheets

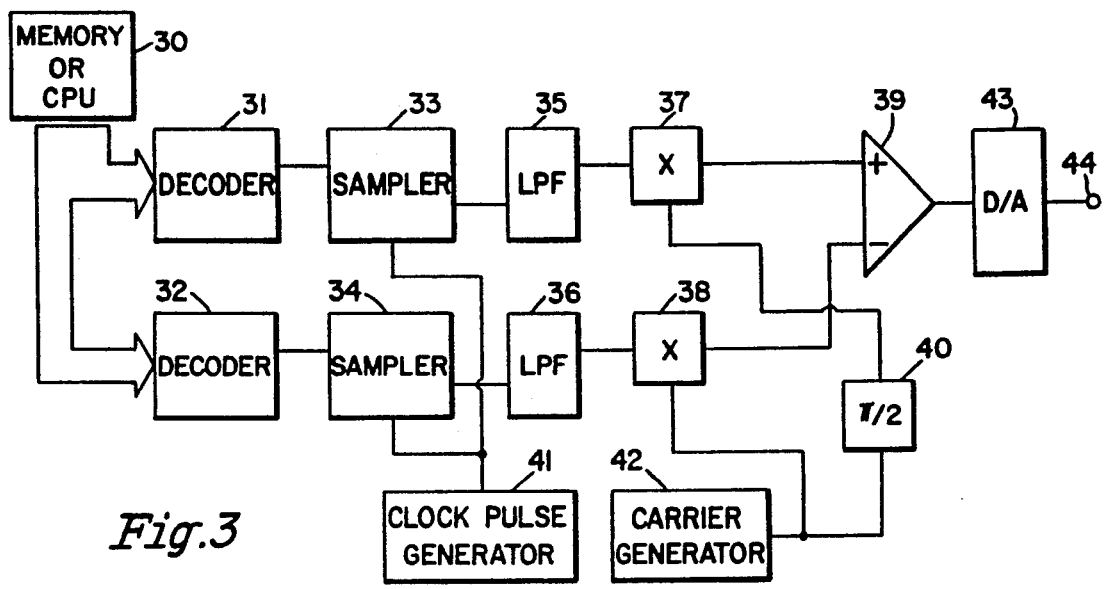
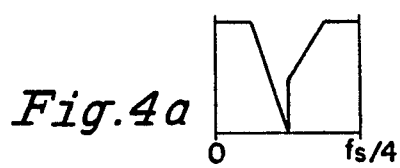
Fig.3
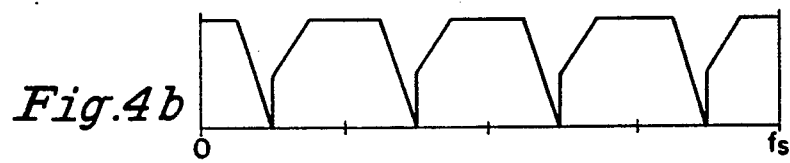
Fig.4a
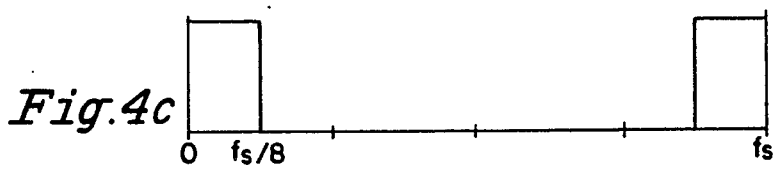
Fig.4b
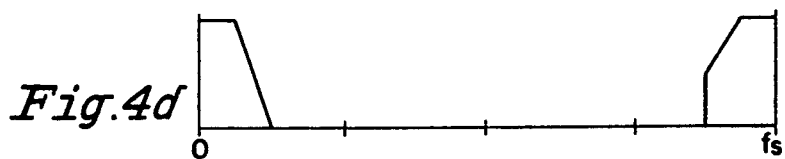
Fig.4c
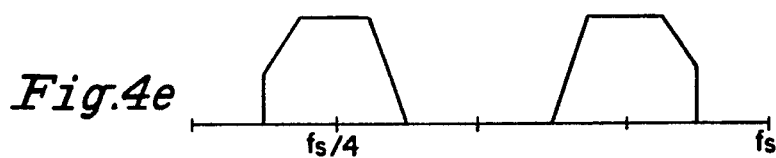
Fig.4d
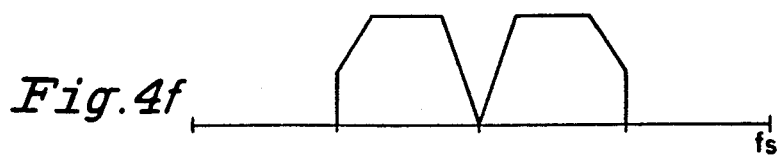
Fig.4e
Fig.4f

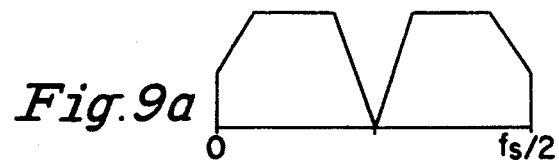
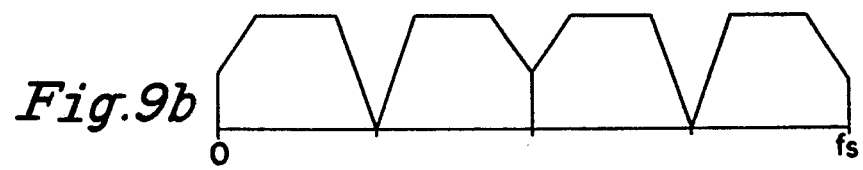
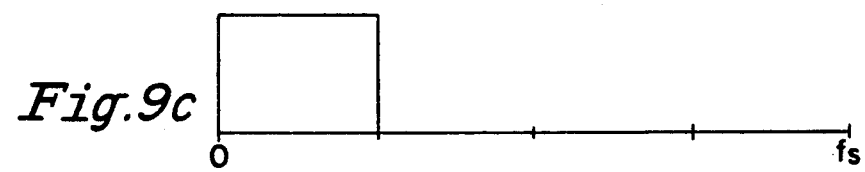
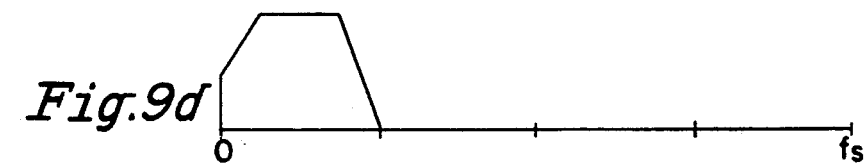
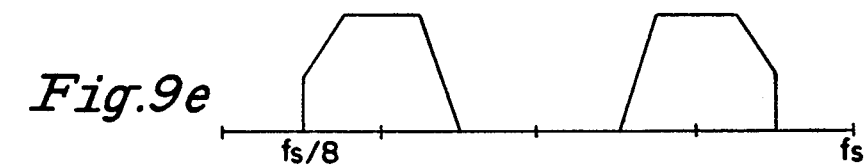
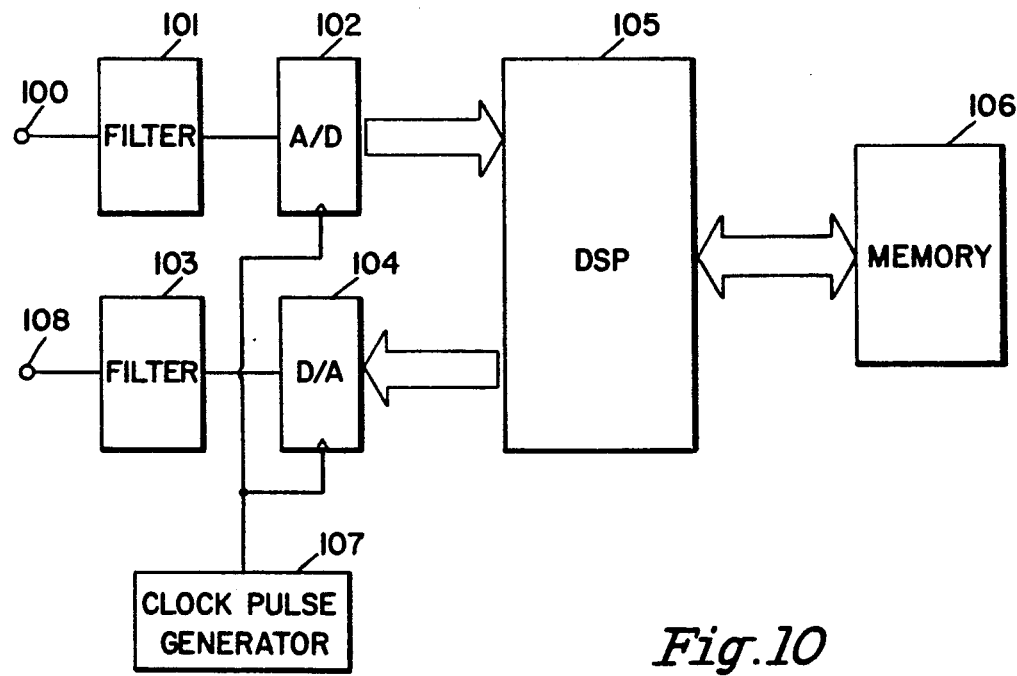

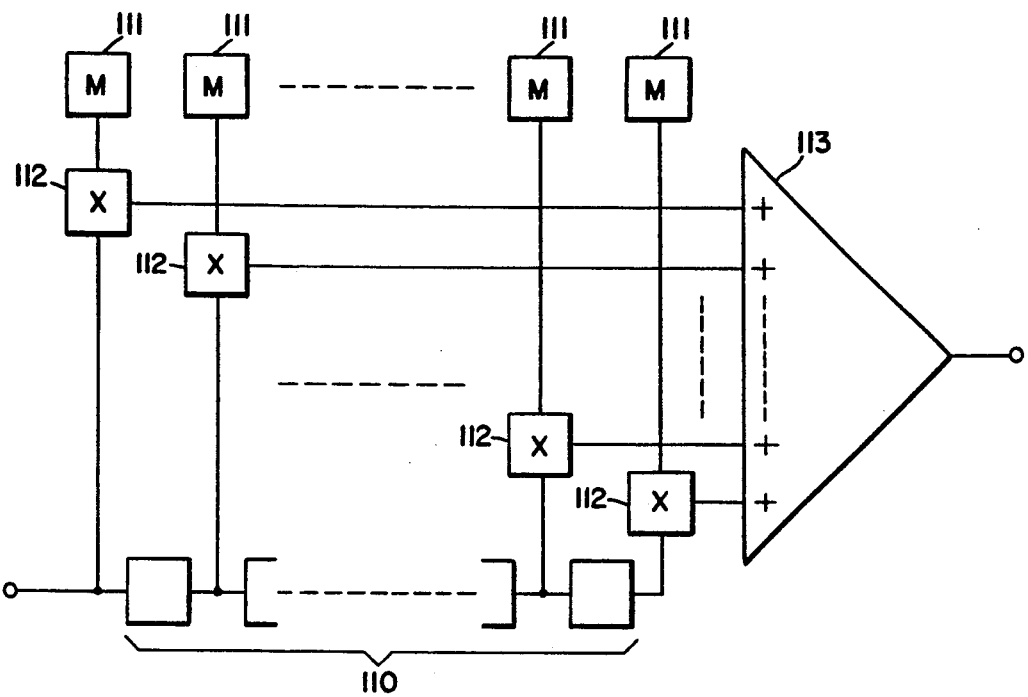
Fig.11
Fig.12
(PRIOR ART)
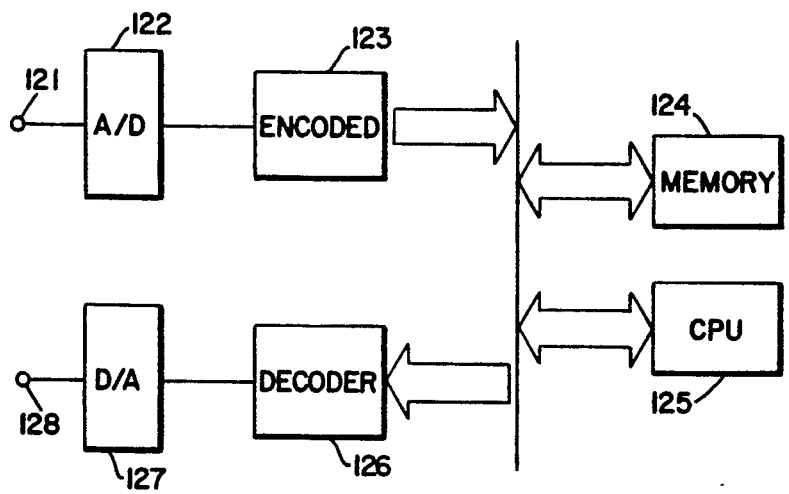

VOICE RECORDING AND REPRODUCING
APPARATUS HAVING PERPENDICULAR
CARRIER MODULATION

BACKGROUND OF THE INVENTION

1. Field of the Invention

This invention relates to a recording apparatus, a reproducing apparatus, and a recording/reproducing apparatus using the recording apparatus and the reproducing apparatus. More particularly, this invention relates to a voice recording apparatus, a voice reproducing apparatus, and a voice recording/reproducing apparatus which are suitable for use in a telephone or the like.

2. Description of the Prior Art

FIG. 12 illustrates a prior art voice recording/reproducing apparatus having recording and reproducing systems. The recording system comprises an A/D converter or sampler 122, and an encoder 123. An analog voice signal input through an input terminal 121 is converted into a digital signal by the A/D converter 122. The digital signal output from the A/D converter 122 is encoded by the encoder 123 using the adaptive differential pulse-code modulation (ADPCM) system. The data output from the encoder 123 are stored in a voice recording memory 124 under the control of a central processing unit (CPU) 125. The reproducing system comprises a decoder 126, and a D/A converter 127. The encoded data read out from the voice recording memory 124 under the control of the CPU 125 are supplied to the decoder 126 to be decoded. The output of the decoder 126 is converted into an analog signal by the D/A converter 127, and then output through an output terminal 128.

In the voice recording/reproducing apparatus utilizing a digital signal processing technique shown in FIG. 12, the data compression rate depends upon the sampling rate of the A/D converter 122 and the type of the encoding system used in the encoder 123. When memories of the same capacity are used, the period of time useful for recording becomes longer with the increase of the data compression rate. In other words, a smaller memory capacity is required to record a voice data set corresponding to a constant period of time.

A small-sized apparatus such as a telephone is allowed to mount a voice recording memory having a small capacity due to the reduced manufacturing cost and the limited volume of the apparatus. This requires a recording/reproducing apparatus to perform the data processing with a high data compression rate. Conventionally, in order to increase the data compression rate in a recording/reproducing apparatus, such countermeasures are performed that the sampling rate is lowered, or that a high rate encoding system is used.

If the sampling rate is lowered, however, the high frequency region of a voice signal is cut, so that there arises a problem in that the quality of voice, especially of a woman's voice, is extremely deteriorated. When a high rate encoding system is used, there exists a problem in that the tone quality is lowered in relatively simple encoding systems such as an ADPCM system. Although it is possible to use another encoding system in which a high encoding rate can be used without reducing the tone quality, there arises problems in that such an encoding system is complicated and that an encoding device using such an encoding system has a complex structure and is expensive.

SUMMARY OF THE INVENTION

The recording apparatus of this invention, which overcomes the above-discussed and numerous other disadvantages and deficiencies of the prior art, comprises: modulation means for modulating an input signal to frequency-shift said input signal, using two carriers which are perpendicular to each other; low-pass filter means for band-limiting the output of said modulation means; sampling means for sampling the output of said low-pass filter means; and encoding means for encoding the output of said sampling means, to produce encoded data.

A reproducing apparatus according to the invention comprises: decoding means for decoding input data which have been encoded; sampling means for sampling the output of said decoding means; low-pass filter means for band-limiting the output of said sampling means; and demodulation means for frequency-shifting the output of said low-pass filter means.

A recording/reproducing apparatus according to the invention comprises: a recording apparatus comprising: modulation means for modulating an input signal to frequency-shift said input signal, using two carriers which are perpendicular to each other; low-pass filter means for band-limiting the output of said modulation means; first sampling means for sampling the output of said low-pass filter means; and encoding means for encoding the output of said first sampling means, to produce encoded data; memory means for storing the encoded data output from said recording apparatus; and a reproducing apparatus for receiving the encoded data read out from said memory means, and for reproducing said input signal, said reproducing apparatus comprising: decoding means for decoding said encoded data; second sampling means for sampling the output of said decoding means; low-pass filter means for band-limiting the output of said second sampling means; and demodulation means for frequency-shifting the output of said low-pass filter means.

Another recording apparatus according to the invention comprises: first band-pass filter means for band-limiting an input signal; second band-pass filter means for band-limiting said input signal, to output a signal component which is perpendicular to the output of said first band-pass filter means; modulation means for modulating the outputs of said first band-pass filter means and said second band-pass filter means using two carriers perpendicular to each other, respectively, to frequency-shift the outputs; sampling means for sampling the output of said modulation means; and encoding means for encoding the output of said sampling means, to produce encoded data.

Another reproducing apparatus according to the invention comprises: decoding means for decoding input data which have been encoded; sampling means for sampling the output of said decoding means; first band-pass filter means for band-limiting the output of said sampling means; second band-pass filter means for band-limiting the output of said sampling means, to output a signal component which is perpendicular to the output of said first band-pass filter means; and demodulation means for demodulating the outputs of said first band-pass filter means and said second band-pass filter means using two carriers perpendicular to each other, to frequency-shift the outputs.

Another recording/reproducing apparatus according to the invention comprises: a recording apparatus comprising: first band-pass filter means for band-limiting an input signal; second band-pass filter means for band-limiting said input signal, to output a signal component which is perpendicular to the output of said first band-pass filter means; modulation means for modulating the outputs of said first band-pass filter means and said second band-pass filter means using two carriers perpendicular to one another, respectively, to frequency-shift the outputs; first sampling means for sampling the output of said modulation means; and encoding means for encoding the output of said sampling means, to produce encoded data; memory means for storing the encoded data output from said recording apparatus; and a reproducing apparatus for receiving encoded data from said memory means, and for reproducing said input data, said reproducing apparatus comprising: decoding means for decoding said encoded data; second sampling means for sampling the output of said decoding means; third band-pass filter means for band-limiting the output of said second sampling means; fourth band-pass filter means for band-limiting the output of said second sampling means, to output a signal component which is perpendicular to the output of said third band-pass filter means; and demodulation means for demodulating the outputs of said third band-pass filter means and said fourth band-pass filter means using two carriers perpendicular to each other, to frequency-shift the outputs.

Thus, the invention described herein makes possible the objectives of:

(1) providing a recording apparatus in which a high data compression rate can be used without reducing tone quality, even if a simple encoding system such as an ADPCM system is used;

(2) providing a reproducing apparatus in which a high data compression rate can be used without reducing tone quality, even if a simple encoding system such as an ADPCM system is used; and (3) providing a recording/reproducing apparatus in which a high data compression rate can be used without reducing tone quality, even if a simple encoding system such as an ADPCM system is used.

BRIEF DESCRIPTION OF THE DRAWINGS

This invention may be better understood and its numerous objects and advantages will become apparent to those skilled in the art by reference to the accompanying drawings as follows:

FIG. 3 is a block diagram showing a reproducing apparatus according to the invention.

FIGS. 4a through f shows frequency characteristics for illustrating the operation of the reproducing apparatus of FIG. 3.

FIGS. 9a through e shows frequency characteristics for illustrating the operation of the reproducing apparatus of FIG. 8.

FIG. 10 is a block diagram showing another recording/reproducing apparatus according to the invention.

FIG. 11 is a block diagram showing a transversal type digital filter.

FIG. 12 is a block diagram showing a prior art recording/reproducing apparatus.

DESCRIPTION OF THE PREFERRED EMBODIMENTS

Figure 1:
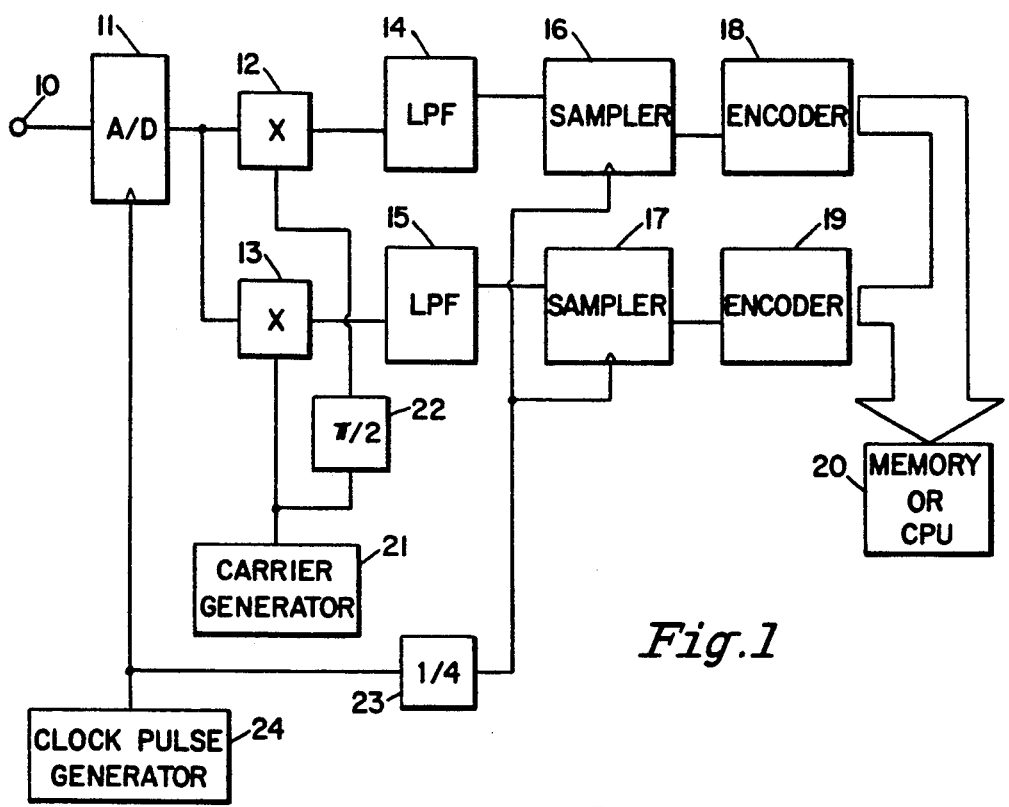
FIG. 1 is a block diagram showing a recording apparatus according to the invention.
Figure 2A:
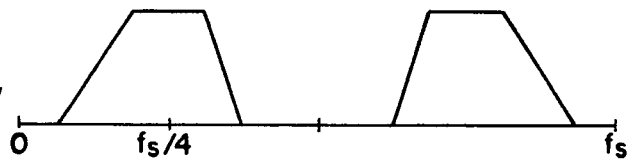
FIGS. 2a through e shows frequency characteristics for illustrating the operation of the recording apparatus of FIG. 1.
Figure 2B:
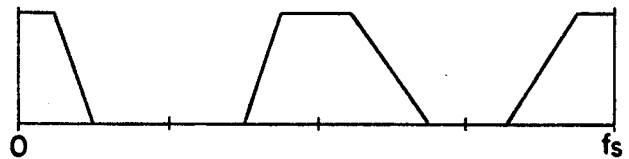
Figure 2C:
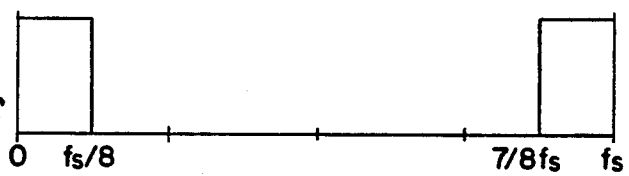
Figure 2D:
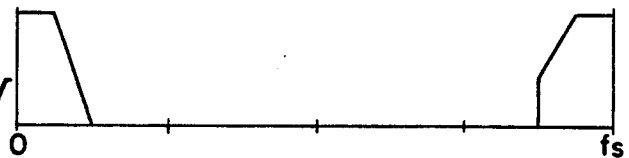
Figure 2E:
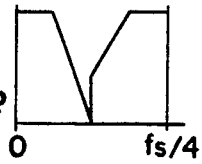

FIG. 1 illustrates a recording apparatus according to the invention. In this embodiment, an analog voice signal is input through an input terminal 10. The input voice signal is converted into a digital signal by an A/D converter 11. A clock pulse generator 24 supplies a clock signal required for the sampling operation of the A/D converter 11. The sampling frequency $f_s$ of the A/D converter 11 is 8 kHz. This value of the sampling frequency $f_s$ is sufficiently low for performing the sampling without deteriorating the frequency characteristics of the voice signal.

The digital voice signal output from the A/D converter 11 are supplied to two multipliers 12 and 13. The multiplier 13 receives a modulation carrier from a carrier generator 21. The multiplier 12 receives a carrier which is phase-shifted from the modulation carrier by a $\pi/2$ phase shifter 22. As a result of the modulation of the voice signal by these multipliers 12 and 13, the voice signal is frequency-shifted. The outputs of the multipliers 12 and 13 are band-limited by low-pass filters 14 and 15, respectively. The outputs of the low-pass filters 14 and 15 are resampled by samplers 16 and 17, respectively. The samplers 16 and 17 receive a clock signal from the clock pulse generator 24 through a ¼ frequency divider 23, which means that the sampling frequency of the samplers 16 and 17 is $f_s/4$ (=2 kHz). The outputs of the samplers 16 and 17 are encoded by encoders 18 and 19, respectively. The encoding system used in the encoders 18 and 19 is the ADPCM system, and the outputs from the samplers 16 and 17 are encoded into 2 bits. Alternatively, another encoding system known in the art may be used. The encoded data output from the encoders 18 and 19 are fed into a memory or CPU 20.

The operation of the recording apparatus shown in FIG. 1 will be described with reference to FIG. 2 which shows the frequency characteristics of respective portions of the apparatus shown in FIG. 1. The frequency characteristics of the voice signal which has been converted into the digital form by the A/D converter 11 are shown in (a) of FIG. 2. Since this voice signal is a discrete one, the actual frequency characteristics are such that the frequency characteristics from 0 to $f_s$ Hz are repeated. The frequency characteristics of the voice signal which has been modulated by the multipliers 12 and 13 are shown in (b) of FIG. 2. The frequency characteristics shown in (b) of FIG. 2 are obtained as the absolute value of a complex number in which the real part is the output of the multiplier 12 and the imaginary part is the output of the multiplier 13. As seen from (b) of FIG. 2, the voice signal is frequency-shifted as a result of the modulation by the multipliers 12 and 13. In the recording apparatus shown in FIG. 1, the frequency of the carrier is set to $f_s/4$, namely the substantially center frequency ($f_s/4$) of the frequency band of the original voice signal is shifted to 0 Hz.

The frequency characteristics at the low-pass filters 14 and 15 are shown in (c) of FIG. 2. The low-pass filters 14 and 15 are of the same structure, and the cutoff frequency of each of the low-pass filters 14 and 15 is set to $f_s/8$. The frequency characteristics of the voice signal which has been band-limited by the low-pass filters 14 and 15 are shown in (d) of FIG. 2. As seen from (d) of FIG. 2, in this embodiment, although a portion of the low frequency region of the voice signal is removed by the low-pass filters 14 and 15, the degradation of the tone quality of the voice is small. In (e) of FIG. 2, the frequency characteristics of the voice signal which has been resampled at the sampling frequency $f_s/4$ by the samplers 16 and 17 are shown. As a result of the above-mentioned frequency shift, the sampling frequency of each of the samplers 16 and 17 can be lowered to $f_s/4$ without damaging the high frequency region of the voice signal.

In the conventional recording/reproducing apparatus shown in FIG. 12, when the sampling frequency is 8 kHz and the encoding rate of the ADPCM system is 2 bits/sample, the data transmission rate is 16 kilobits/sec. In contrast, according to this embodiment, the sampling frequency of each of the samplers 16 and 17 is 2 kHz which is a quarter of the sampling frequency conventionally required, and the encoding is performed with respect to the outputs of the samplers 16 and 17 by the encoders 18 and 19. Therefore, the total data transmission rate is $2k \times 2 \times 2 = 8$ kilobits/sec, which means that the data compression rate can be twice as compared with that in the prior art.

FIG. 3 illustrates a reproducing apparatus according to the invention. The reproducing apparatus of this embodiment can be used to reproduce the voice recorded in the recording apparatus of FIG. 1. A memory or CPU 30 supplies the encoded data to decoders 31 and 32. The data supplied to the decoders 31 and 32 correspond to the data output from the encoders 18 and 19 shown in FIG. 1, respectively, and the data transmission rate equals the sampling frequency $f_s/4$. The decoded voice signals output from the decoders 31 and 32 are sampled at the sampling frequency $f_s$ by samplers 33 and 34, respectively. The samplers 33 and 34 receive sampling clock pulses from a clock pulse generator 41. The outputs of the samplers 33 and 34 are band-limited by low-pass filters 35 and 36.

The outputs of the low-pass filters 35 and 36 are supplied to multipliers 37 and 38, respectively. The multiplier 38 receives a demodulation carrier from a carrier generator 42. The multiplier 37 receives a carrier which has been phase-shifted by a $\pi/2$ phase shifter 40. The voice signals input to the multipliers 37 and 38 are demodulated by the multipliers 37 and 38 and a subtracter 39. As a result, the voice signals are frequency-shifted. The subtracter 39 is used to obtain the real parts of the outputs of the multipliers 37 and 38. The voice signal output from the subtracter 39 is converted back into an analog voice signal by a D/A converter 43, and then the analog voice signal is output through an output terminal 44.

The operation of the reproducing apparatus shown in FIG. 3 will be described with reference to FIG. 4 which shows the frequency characteristics of the respective portions of the reproducing apparatus shown in FIG. 3. In (a) of FIG. 4, the frequency characteristics of the voice signals output from the decoders 31 and 32, which are the same as those shown in (e) of FIG. 2, are shown. The frequency characteristics of the voice signals obtained as a result of the sampling by the samplers 33 and 34 are shown in (b) of FIG. 4. The frequency characteristics of the low-pass filters 35 and 36 are shown in (c) of FIG. 4. The cutoff frequency of each of the low-pass filters 35 and 36 is set to $f_s/8$ Hz. The frequency characteristics of the voice signals which have been band-limited by the low-pass filters 35 and 36 are shown in (d) of FIG. 4.

The frequency characteristics of the voice signals which have been demodulated and frequency-shifted by the multipliers 37 and 38 and the subtracter 39 are shown in (e) of FIG. 4. As seen from (e) of FIG. 4, according to this embodiment, the frequency of the demodulation carrier is selected to $f_s/4$ which is the same as that of the modulation carrier used in the recording apparatus of FIG. 1, in order that the 0 Hz component of the voice signal before the demodulation is frequency-shifted to $f_s/4$. As seen from the comparison of (e) of FIG. 4 and (a) of FIG. 2, the voice signals are frequency-shifted so as to return to the original band. In order to shift the voice signals into the original band by the demodulation, it is required that the shift direction in modulating should be opposite to that in demodulating. For example, if the complex expression of the modulation carrier supplied to the multipliers 12 and 13 is $\exp(j\omega t)$, the complex expression of the demodulation carrier is $\exp(-j\omega t)$ so that the sign of the imaginary part is reversed.

Alternatively, the frequency of the demodulation carrier may be different from the frequency of the modulation carrier used in the recording apparatus of FIG. 1. When the frequency of the demodulation carrier is set to $(\frac{3}{8})f_s$ which is higher than that of the modulation carrier, for example, the frequency band of the voice signal after demodulation is higher than the original band of the voice signal, as shown in (f) of FIG. 4. Thus, if the frequency of the demodulation carrier is set to be different from that of the modulation carrier, the tone quality of the reproduced voice can be changed.

Figure 5:
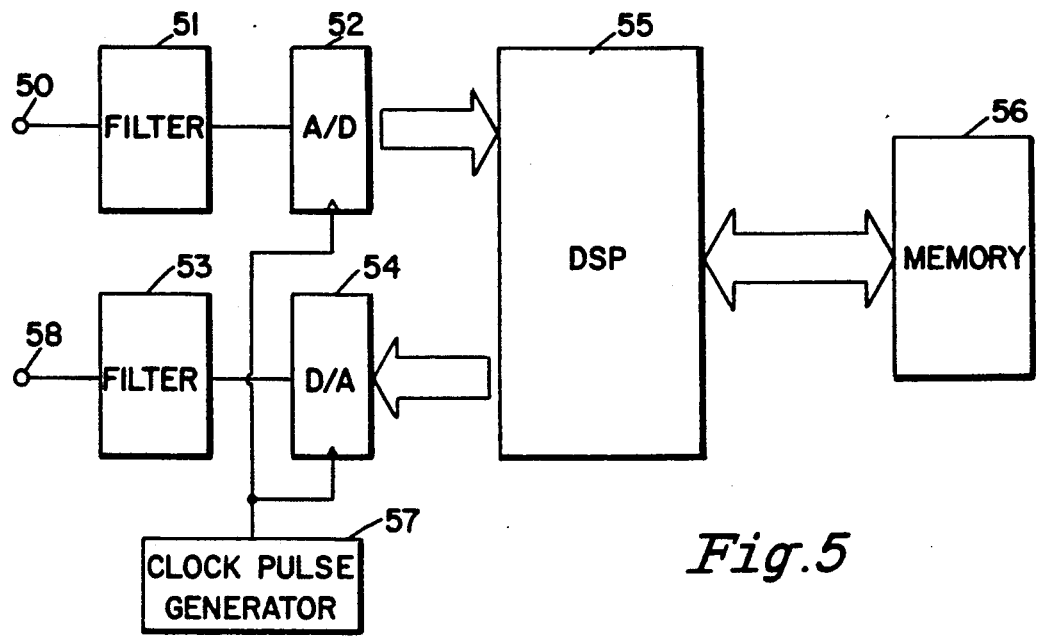
FIG. 5 is a block diagram showing a recording/reproducing apparatus according to the invention.

FIG. 5 shows a recording/reproducing apparatus according to the invention. The apparatus of this embodiment has the functions of the recording apparatus of FIG. 1 and the reproducing apparatus of FIG. 3. An analog voice signal input through an input terminal 50 is filtered by an analog filter 51 which prevents the aliasing from occurring. The output of the analog filter 51 is input to an A/D converter 52 which converts the analog signal into a digital signal in accordance with a sample clock pulse generated by a clock pulse generator 57. The A/D converter 52 and clock pulse generator 57 correspond to the A/D converter 11 and clock pulse generator 24 shown in FIG. 1. The output of the A/D converter 52 is supplied to a digital signal processor (DSP) 55. The reproduced signal output from the DSP 55 is converted into an analog signal by a D/A converter 54, and then filtered by an analog filter 53 which prevents the aliasing from occurring, to be output through an output terminal 58. The clock pulse generator 57 supplies clock signals to both the A/D converter 52 and the D/A converter 54.

In the embodiment, the portions corresponding to the recording apparatus shown in FIG. 1 except for the A/D converter 11 and those corresponding to the reproducing apparatus shown in FIG. 3 except for the D/A converter 43 are realized using a software of the DSP 55. In the recording operation, the DSP 55 performs the same processing as that in the recording apparatus of FIG. 1 with respect to the input voice signal from the A/D converter 52, and then the resulting recording data are stored in a memory 56. In the reproducing operation, the DSP 55 reads data from the memory 56 and performs the same processing as that in the reproducing apparatus of FIG. 3 with respect to the data. Then, the reproduced voice signal is fed to the D/A converter 54.

Figure 6:
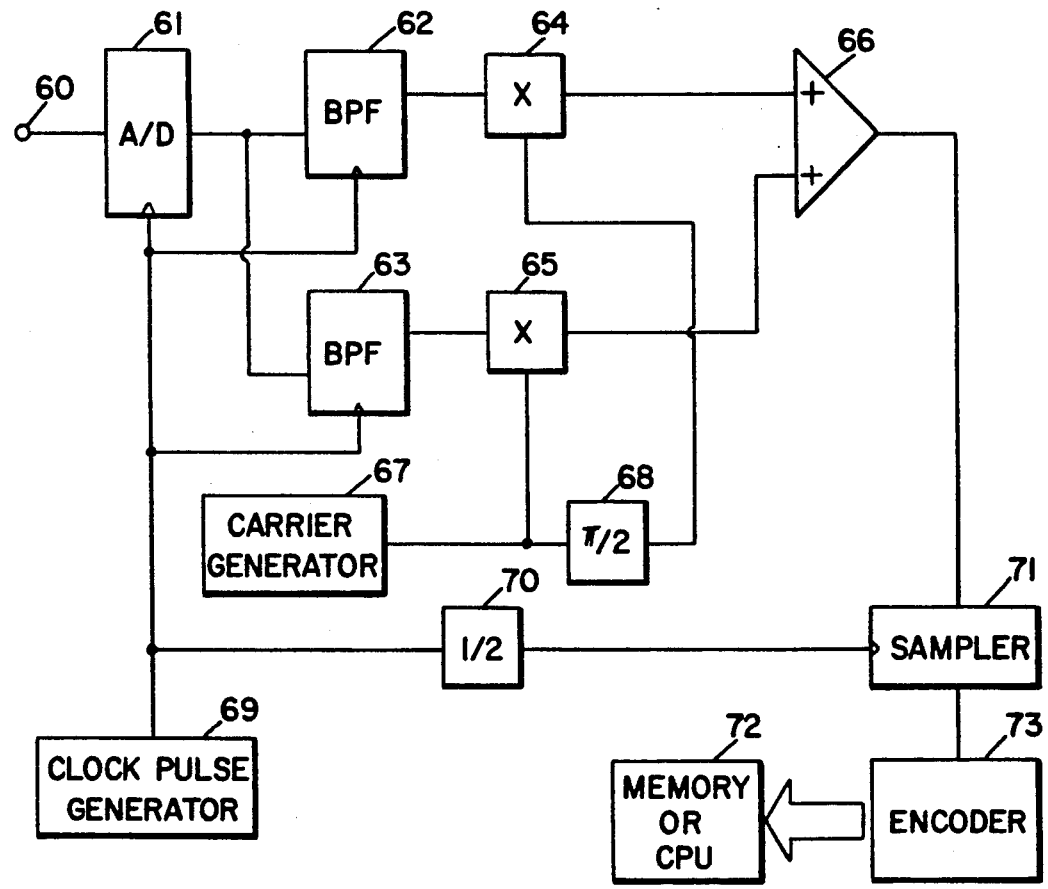
FIG. 6 is a block diagram showing another recording apparatus according to the invention.
Figure 7A:
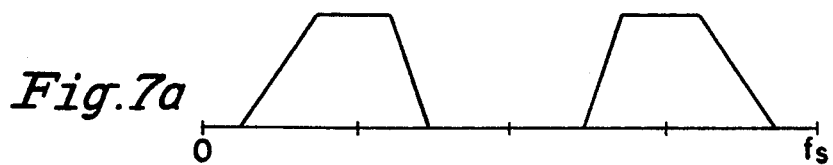
FIGS. 7a through e shows frequency characteristics for illustrating the operation of the recording apparatus of FIG. 6.
Figure 7B:
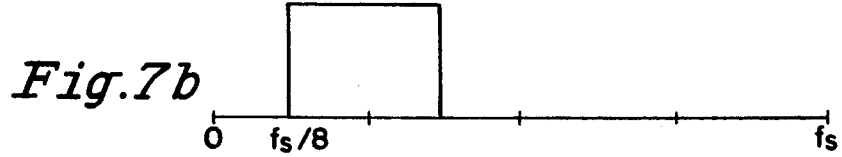
Figure 7C:
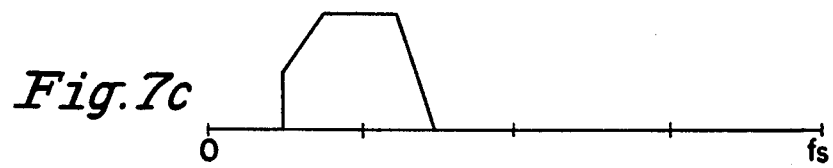
Figure 7D:
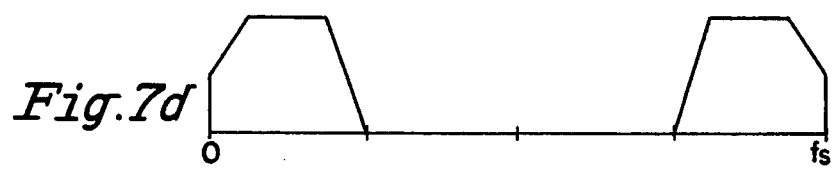
Figure 7E:
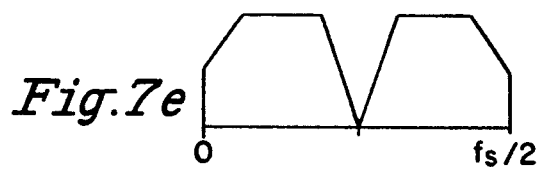

FIG. 6 illustrates another recording apparatus according to the invention. In this embodiment, an analog voice signal is input through an input terminal 60. The input voice signal is converted into a digital signal by an A/D converter 61. A clock signal required for the sampling operation of the A/D converter 61 is supplied from a clock pulse generator 69. The sampling frequency $f_s$ of the A/D converter 61 is 8 kHz. This value of the sampling frequency is sufficiently low for performing the sampling without damaging the frequency characteristics of the voice signal.

The digital voice signal output from the A/D converter 61 is fed to two band-pass filters 62 and 63 which receive clock signals required to perform the operation from a clock pulse generator 69. The band-pass filters 62 and 63 limit the bandwidth of the input voice signals, and respectively output two components of the input voice signal which are perpendicular to each other. The output of the band-pass filter 62 is referred to as "inphase component", and the output of the band-pass filter 63 as "perpendicular component". Both the band-pass filters 62 and 63 may be realized using a transversal type digital filter shown in FIG. 11. The digital filter shown in FIG. 11 comprises delay circuits 110 such as shift registers, gain tap coefficient memories 111, multipliers 112, and an adder 113. The gain tap coefficient of the band-pass filter 63 which outputs the perpendicular component is obtained by Hilbert transformation of the gain tap coefficient of the band-pass filter 62 which outputs the inphase component.

The inphase component output from the band-pass filter 62 and the perpendicular component output from the band-pass filter 63 are supplied to multipliers 64 and 65, respectively. The multiplier 64 receives a modulation carrier from a carrier generator 67. The multiplier 65 receives a carrier which is phase-shifted from the modulation carrier by a $\pi/2$ phase shifter 68. The outputs of the multipliers 64 and 65 are added by an adder 66. The voice signals are modulated by the multipliers 64 and 65 and the adder 66, to be frequency-shifted. The output of the adder 66 is resampled by a sampler 71. The sampler 71 receives a sampling clock signal the frequency of which is divided by a ½ frequency divider 70 to be half of that of the clock signal from the clock pulse generator 69. Therefore, the sampling frequency of the sampler 71 is $f_s/2$ (=4 kHz). The output of the sampler 71 is encoded by an encoder 73. The encoding system used in the encoder 73 is the ADPCM system, and the output from the sampler 71 is encoded into 2 bits. Alternatively, another encoding system known in the art may be used. The encoded data output from the encoder 71 is fed to a memory or CPU 72.

The operation of the recording apparatus of FIG. 6 will be described with reference to FIG. 7 which shows the frequency characteristics of respective portions of the recording apparatus shown in FIG. 6. The frequency characteristics of the voice signal after the A/D conversion by the A/D converter 61 are shown in (a) of FIG. 7. Since the voice signal is the discrete one, the actual frequency characteristics are such that the frequency characteristics from 0 to $f_s$ Hz are repeated. The frequency characteristics of the band-pass filters 62 and 63 are shown in (b) of FIG. 7. The frequency characteristics shown in (b) of FIG. 7 are realized by combining the band-pass filter 62 which outputs the inphase component of the input signal with the band-pass filter 63 which outputs the perpendicular component of the input signal. The lower cutoff frequency of the band-pass filter 62 and 63 is set to $f_s/8$. The frequency characteristics of the voice signals output from the band-pass filters 62 and 63 are shown in (c) of FIG. 7. The frequency characteristics shown in (c) of FIG. 7 are obtained as an absolute value of a complex number in which the real part is the output of the band-pass filter 62 and the imaginary part is the output of the band-pass filter 63. As seen from (c) of FIG. 7, in this embodiment, although a portion of the low frequency region of the voice signal is removed by the band-pass filters 62 and 63, the degradation of the tone quality of the voice is small.

The frequency characteristics of the voice signals after the modulation by the multipliers 64 and 65 and the adder 66 are shown in (d) of FIG. 7. As seen from (d) of FIG. 7, the voice signals are frequency-shifted by this modulation. In this embodiment, the frequency of the carrier is selected to be $f_s/8$ so that the lowest frequency component of the voice signals output from the band-pass filters 62 and 63 is shifted to 0 Hz. The value of the carrier frequency is selected mainly depending upon the characteristics of the band-pass filters 62 and 63. in (d) of FIG. 7, the frequency component appears in the negative direction because the real part of the signals in taken out by the adder 66. The frequency characteristics of the voice signal after the resampling at the sampling frequency $f_s/2$ by the sampler 71 are shown in (e) of FIG. 7. Due to the above-mentioned frequency shift the sampling frequency of the sampler 71 can be lowered to $f_s/2$ without damaging the high frequency region of the voice signal.

In the conventional recording/reproducing apparatus of FIG. 12, when the sampling frequency is 8 kHz and the encoding rate of the ADPCM system is 2 bits/sample, the data transmission rate is 16 kilobits/sec. In contrast, according to this embodiment, the sampling frequency of the sampler 71 is 4 kHz which is one half of the sampling frequency required in the prior art, and the data transmission rate becomes $4 k \times 2 = 8$ kilobits/sec, which means that the data compression rate can be twice as compared with the prior art.

Figure 8:
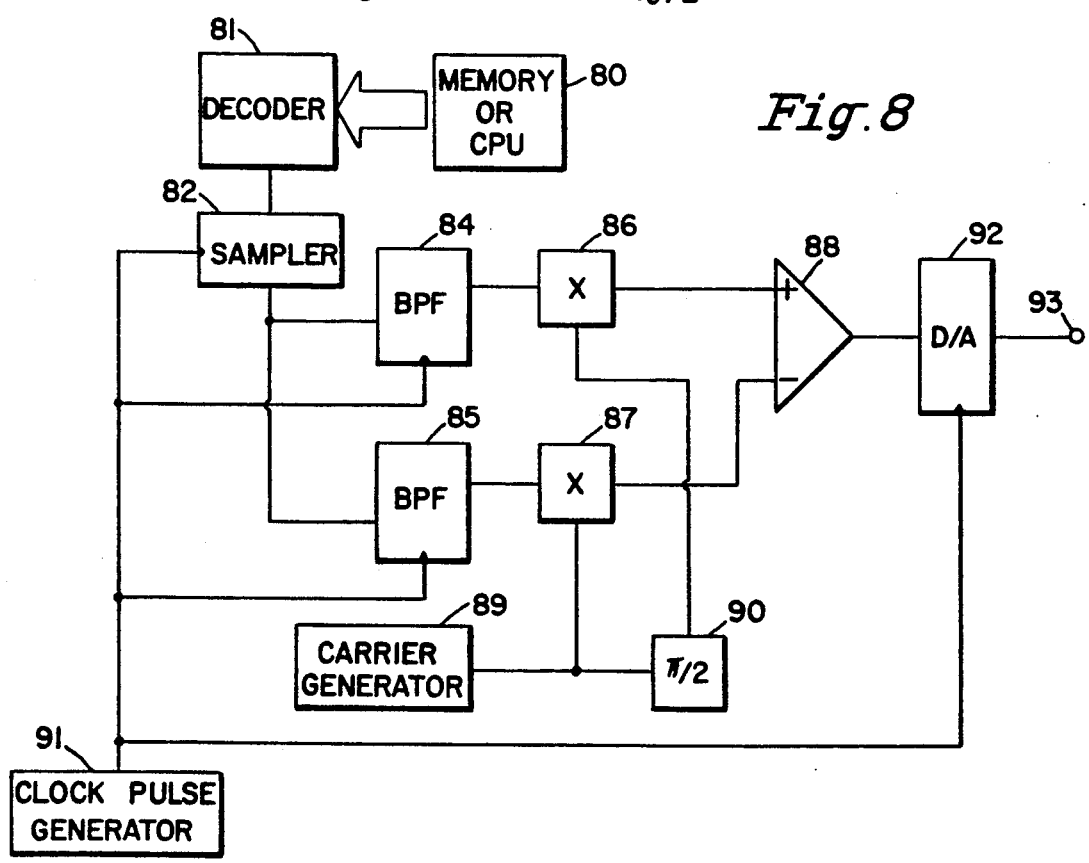
FIG. 8 is a block diagram showing another reproducing apparatus according to the invention.

Another reproducing apparatus according to the invention is shown in FIG. 8. The reproducing apparatus of this embodiment is used to reproduce the voice recorded in the recording apparatus of FIG. 6. A memory or CPU 80 supplies encoded data to a decoder 81. The data supplied to the decoder 81 correspond to the data output from the encoder 73 shown in FIG. 6, and the data transmission rate corresponds to the sampling frequency $f_s/2$. The decoded voice signal output from the decoder 81 is sampled at the sampling frequency $f_s$ by a sampler 82. The sampler 82 receives a sampling clock signal from a clock pulse generator 91. The output of the sampler 82 is fed to band-pass filters 84 and 85 each of which receives a clock signal required to perform the operation from the clock pulse generator 91. The band-pass filters 84 and 85 limit the bandwidth of the input signal and output the inphase and perpendicular components of the input signal, respectively. The band-pass filters 84 and 85 are realized by a transversal type digital filter shown in FIG. 11, in a similar manner as the band-pass filters 62 and 63 provided in the recording apparatus of FIG. 6. The gain tap coefficient of the band-pass filter 85 which outputs a perpendicular component is obtained by Hilbert transformation of the gain tap coefficient of the band-pass filter 84 which outputs an inphase component.

The outputs of the band-pass filters 84 and 85 are supplied to multipliers 86 and 87, respectively. The multiplier 87 receives a demodulation carrier from a carrier generator 89. The multiplier 86 receives a carrier which is phase-shifted from the demodulation carrier by a $\pi/2$ phase shifter 90. The voice signals input to the multipliers 86 and 87 are demodulated by the multipliers 86 and 87 and a subtracter 88, to be frequency-shifted. The subtracter 88 is used to obtain the real part of the outputs of the multipliers 86 and 87. The voice signal output from the subtracter 88 is converted back into an analog voice signal by a D/A converter 92, and then the analog voice signals are output through an output terminal 93.

The operation of the reproducing apparatus of FIG. 8 will be described with reference to FIG. 9 which shows the frequency characteristics of respective portions in the reproducing apparatus of FIG. 8. In (a) of FIG. 9, the frequency characteristics of the voice signal output from the decoder 81 are shown, which are the same as those shown in (e) of FIG. 7. The frequency characteristics of the voice signal which has been sampled by the sampler 82 are shown in (b) of FIG. 9. In (c) of FIG. 9, the frequency characteristics at the band-pass filters 84 and 85 are shown. The frequency characteristics are realized by combining the band-pass filter 84 which outputs the inphase component of the input signal with the band-pass filter 85 which outputs the perpendicular component of the input signal. The frequency characteristics of the voice signals which have been band-limited by the band-pass filters 84 and 85 are shown in (d) of FIG. 9.

In (e) of FIG. 9, the frequency characteristics of the voice signals which have been demodulated by the multipliers 86 and 87 and the subtracter 88 and frequency-shifted are shown. As seen from (e) of FIG. 9, in this embodiment, the frequency of the demodulation carrier is selected to be $f_s/8$ which is the same as the frequency of the modulation carrier in the recording apparatus shown in FIG. 6, so that the 0 Hz component of the voice signal prior to the demodulation is shifted to $f_s/8$. As is apparent from the comparison between (e) of FIG. 9 and (a) of FIG. 7, the voice signal is shifted to the original band by the multipliers 86 and 87 and the subtracter 88. In this embodiment, as described above with regard to the reproducing apparatus shown in FIG. 3, the demodulation carrier should be carefully selected.

In this embodiment, in the same manner as described above with regard to the reproducing apparatus shown in FIG. 3, if the frequency of the demodulation carrier is selected to be different from that of the modulation carrier in the recording apparatus shown in FIG. 6, the tone quality of the reproduced voice can be changed.

The recording apparatus shown in FIG. 6 may be alternatively modified in such a manner that the center frequency of the voice signal is shifted to 0 Hz as a result of the modulation by the multipliers 64 and 65. In this modified case, the frequency of the carrier supplied to the multipliers 64 and 65 is set to be substantially equal to the center frequency (e.g., $f_s/4$) of the voice signal. In place of the adder 66, sampler 71 and the encoder 73 in FIG. 6, this modified apparatus may comprise two samplers which sample the outputs of the multipliers 64 and 65 at the sampling frequency $f_s/4$, respectively, and two encoders which encode the outputs of the two samplers, respectively. Such a modified recording apparatus can be used in conjunction with the reproducing apparatus shown in FIG. 3 as it is.

FIG. 10 shows another recording/reproducing apparatus according to the invention. The apparatus of this embodiment has the functions of the recording apparatus of FIG. 6 and the reproducing apparatus of FIG. 8. An analog voice signal input through an input terminal 100 is filtered by an analog filter 101 which prevents the aliasing from occurring. The output of the analog filter 101 is input to an A/D converter 102 which then converts the analog voice signal into a digital signal in accordance with a sampling clock pulse produced from a clock pulse generator 107. The A/D converter 102 and clock pulse generator 107 correspond to the A/D converter 61 and clock pulse generator 69 shown in FIG. 6, respectively. The output of the A/D converter 102 is coupled to a DSP 105. The reproducing signal output from the DSP 105 is converted into an analog signal by a D/A converter 104, and then filtered by an analog filter 103 which prevents the aliasing from occurring. The filtered analog signal is output through an output terminal 108. The clock pulse generator 107 supplies clock signal to both the A/D converter 102 and the D/A converter 104.

In this embodiment, the portions corresponding to the recording apparatus shown in FIG. 6 except for the A/D converter 61 and those corresponding to the reproducing apparatus shown in FIG. 8 except for the D/A converter 92 are realized using a software of the DSP 105. In the recording operation, the DSP 105 performs the same processing as that in the recording apparatus of FIG. 6 with respect to the voice signal input from the A/D converter 102, and then the resulting recording data are stored in a memory 106. In the reproducing operation, the DSP 105 reads data from the memory 106 and performs the same processing as that in the reproducing apparatus of FIG. 8 with respect to the data, and then the reproduced voice signals are fed to the D/A converter 104.

In the above-mentioned embodiments, an A/D converter or a D/A converter is provided. When the voice signal to be input or output is a digital signal, however, the A/D converter and D/A converter will not required.

According to the invention, a recording apparatus, a reproducing apparatus and a recording/reproducing apparatus can compress voice data with a higher data compression rate without deteriorating the tone quality of the voice, while a simple encoding system such as an ADPCM system is used. According to the invention, for example, when reproducing voice, the tone quality of the reproduced voice can be easily differed from the recorded original voice.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A recording apparatus comprising:
   modulation means for modulating an input signal to frequency-shift said input signal, using two carriers which are perpendicular to each other;
   low-pass filter means for band-limiting the output of said modulation means;
   sampling means for sampling the output of said low-pass filter means; and
   encoding means for encoding the output of said sampling means, to produce encoded data.

2. A reproducing apparatus comprising:
   decoding means for decoding input data which have been encoded;
   sampling means for sampling the output of said decoding means;
   low-pass filter means for band-limiting the output of said sampling means; and
   demodulation means for frequency-shifting the output of said low-pass filter means.

3. A recording/reproducing apparatus comprising:
   a recording apparatus comprising: modulation means for modulating an input signal to frequency-shift said input signal, using two carriers which are perpendicular to each other; low-pass filter means for band-limiting the output of said modulation means; first sampling means for sampling the output of said low-pass filter means; and encoding means for encoding the output of said first sampling means, to produce encoded data;
   memory means for storing the encoded data output from said recording apparatus; and
   a reproducing apparatus for receiving the encoded data read out from said memory means, and for reproducing said input signal, said reproducing apparatus comprising: decoding means for decoding said encoded data; second sampling means for sampling the output of said decoding means; low-pass filter means for band-limiting the output of said second sampling means; and demodulation means for frequency-shifting the output of said low-pass filter means.

4. A recording apparatus comprising:
   first band-pass filter means for band-limiting an input signal;
   second band-pass filter means for band-limiting said input signal, to output a signal component which is perpendicular to the output of said first band-pass filter means;
   modulation means for modulating the outputs of said first band-pass filter means and said second band-pass filter means using two carriers perpendicular to each other, respectively, to frequency-shift the outputs;
   sampling means for sampling the output of said modulation means; and
   encoding means for encoding the output of said sampling means, to produce encoded data.

5. A reproducing apparatus comprising:
   decoding means for decoding input data which have been encoded;
   sampling means for sampling the output of said decoding means;
   first band-pass filter means for band-limiting the output of said sampling means;
   second band-pass filter means for band-limiting the output of said sampling means, to output a signal component which is perpendicular to the output of said first band-pass filter means; and
   demodulation means for demodulating the outputs of said first band-pass filter means and said second band-pass filter means using two carriers perpendicular to each other, to frequency-shift the outputs.

6. A recording/reproducing apparatus comprising:
   a recording apparatus comprising: first band-pass filter means for band-limiting an input signal; second band-pass filter means for band-limiting said input signal, to output a signal component which is perpendicular to the output of said first band-pass filter means; modulation means for modulating the outputs of said first band-pass filter means and said second band-pass filter means using two carriers perpendicular to each other, respectively, to frequency-shift the outputs; first sampling means for sampling the output of said modulation means; and encoding means for encoding the output of said sampling means, to produce encoded data;
   memory means for storing the encoded data output from said recording apparatus; and
   a reproducing apparatus for receiving encoded data from said memory means, and for reproducing said input data, said reproducing apparatus comprising: decoding means for decoding said encoded data; second sampling means for sampling the output of said decoding means; third band-pass filter means for band-limiting the output of said second sampling means; fourth band-pass filter means for band-limiting the output of said second sampling means, to output a signal componenent which is perpendicular to the output of said third band-pass filter means; and demodulation means for demodulating the outputs of said third band-pass filter means and said fourth band-pass filter means using two carriers perpendicular to each other, to frequency-shift the outputs.

* * * * *